United States Patent
Imai et al.

(10) Patent No.: US 10,089,370 B2
(45) Date of Patent: *Oct. 2, 2018

(54) EXTRACTION DEVICE, DATA PROCESSING SYSTEM, AND EXTRACTION METHOD

(71) Applicant: International Business Machines Corporation, Armonk, NY (US)

(72) Inventors: Haruki Imai, Kanagawa (JP); Hideaki Komatsu, Kanagawa (JP); Akira Koseki, Kanagawa (JP); Toshiro Takase, Chiba (JP)

(73) Assignee: International Business Machines Corporation, Armonk, NY (US)

( * ) Notice: Subject to any disclaimer, the term of this patent is extended or adjusted under 35 U.S.C. 154(b) by 486 days.

This patent is subject to a terminal disclaimer.

(21) Appl. No.: 14/748,205

(22) Filed: Jun. 23, 2015

(65) Prior Publication Data

US 2015/0293981 A1 Oct. 15, 2015

Related U.S. Application Data

(63) Continuation of application No. 14/557,459, filed on Dec. 2, 2014, now Pat. No. 9,984,134.

(30) Foreign Application Priority Data

Dec. 13, 2013 (JP) .................................. 2013-257689

(51) Int. Cl.
*G06F 17/30* (2006.01)

(52) U.S. Cl.
CPC .. *G06F 17/30563* (2013.01); *G06F 17/30569* (2013.01)

(58) Field of Classification Search
CPC .............. G06F 17/30568; G06F 17/30; G06F 17/30569; G06F 17/30563;

(Continued)

(56) References Cited

U.S. PATENT DOCUMENTS 7,216,116 B1 * 5/2007 Nilsson ............. G06F 17/30398
707/E17.014
7,379,654 B2 * 5/2008 Gates ...................... H04N 5/76
348/513

(Continued)

FOREIGN PATENT DOCUMENTS

CN 101996250 A 3/2011
JP 2006-338432 A 12/2006 ............. G06F 12/00

(Continued)

OTHER PUBLICATIONS

Upadhyay et al., "A Fuzzy Clustering Algorithm for High Dimensional Streaming Data," Journal of Information Engineering and Applications, vol. 3, No. 10, 2013, 10 pages.

(Continued)

*Primary Examiner* — Anh Ly

(74) *Attorney, Agent, or Firm* — Peter J. Edwards

(57) ABSTRACT

An extraction method for extracting a sub query to be converted to a program for processing stream data continuously inputted to a database, from a query including instructions, as sub queries, to be issued to a database management system. The extraction method includes receiving input of the query and a lower limit value of efficiency as processing time per unit memory increase amount. A calculating operation calculates a one memory increase amount and the efficiency using the memory increase amount and the processing time to be reduced. The method selects a sub query whose calculated efficiency is equal to or higher than the lower limit value and extracts the selected sub query as a conversion object on condition that the integrated memory increase amount is equal to or smaller than the maximum memory increase amount.

4 Claims, 14 Drawing Sheets

(58) Field of Classification Search
CPC ......... G06F 17/30516; G06F 17/30306; G06F 17/30436; G06F 9/5083; G06F 17/30554; G06F 17/30017; G06F 17/30489
See application file for complete search history.

(56) References Cited

U.S. PATENT DOCUMENTS

| | | | |
|---|---|---|---|
| 8,219,518 B2* | 7/2012 | Jin | G06F 8/20 707/602 |
| 2002/0194211 A1* | 12/2002 | Subramanian | G06F 12/0253 711/E12.009 |
| 2005/0050016 A1* | 3/2005 | Stanoi | G06F 17/30917 707/E17.012 |
| 2005/0094455 A1* | 5/2005 | Wu | G11B 19/04 365/208 |
| 2006/0068911 A1* | 3/2006 | Pirich | A63F 13/12 463/40 |
| 2006/0122876 A1* | 6/2006 | Von Schweber | G06F 17/30705 705/7.32 |
| 2007/0186036 A1* | 8/2007 | Bittner, Jr. | G11C 15/00 711/108 |
| 2007/0192306 A1* | 8/2007 | Papakonstantinou | G06F 17/30864 707/E17.108 |
| 2007/0288475 A1* | 12/2007 | Shen | G06F 17/30516 707/E17.032 |
| 2008/0046673 A1* | 2/2008 | Hwang | G06F 11/3612 711/170 |
| 2009/0006429 A1* | 1/2009 | Champion | G06F 8/427 707/E17.004 |
| 2009/0115905 A1* | 5/2009 | Estrop | G06T 5/20 348/598 |
| 2009/0119261 A1* | 5/2009 | Ismalon | G06F 17/3064 707/E17.014 |
| 2009/0132503 A1* | 5/2009 | Sun | G06F 17/30427 707/E17.014 |
| 2009/0187915 A1* | 7/2009 | Chew | G06F 9/5033 718/104 |
| 2009/0259646 A1* | 10/2009 | Fujita | G06F 17/3064 707/E17.108 |
| 2011/0035403 A1* | 2/2011 | Ismalon | G06F 17/3064 707/769 |
| 2011/0047554 A1* | 2/2011 | Lakshmanan | G06F 9/5088 718/105 |
| 2011/0047555 A1* | 2/2011 | Lakshmanan | G06F 9/5088 718/105 |
| 2011/0161371 A1* | 6/2011 | Thomson | G06F 17/30398 707/792 |
| 2011/0219208 A1* | 9/2011 | Asaad | G06F 15/76 712/12 |
| 2012/0066470 A1* | 3/2012 | Fukuda | G06F 12/023 711/171 |
| 2013/0104107 A1* | 4/2013 | De Smet | G06F 11/3636 717/125 |
| 2013/0191676 A1* | 7/2013 | Mase | G06F 1/28 713/340 |
| 2014/0164388 A1* | 6/2014 | Zhang | G06F 17/30911 707/742 |
| 2015/0169714 A1* | 6/2015 | Imai | G06F 17/30563 707/602 |
| 2015/0293981 A1* | 10/2015 | Imai | G06F 17/30563 707/602 |

FOREIGN PATENT DOCUMENTS

| | | | |
|---|---|---|---|
| JP | 2010079646 A | 4/2010 | |
| JP | 2010-108073 A | 5/2010 | ............ G06F 17/30 |
| JP | 2010-217968 A | 9/2010 | ............ G06F 11/20 |
| JP | 2011-059967 A | 3/2011 | ............ G06F 12/00 |
| JP | 5939583 B2 | 6/2016 | |
| WO | 2013145310 A1 | 10/2013 | |

OTHER PUBLICATIONS

Haruki Imai et al., "Extraction Device, Data Processing System, and Extraction Method," U.S. Appl. No. 14/557,459, filed Dec. 2, 2014.
List of IBM Patents or Patent Applications Treated as Related, Dated Oct. 19, 2016, 2 pages.
Unknown, "Decision to Grant a Patent" for patent titled "An extracting apparatus, a data processing system, an extraction method, and extraction program," Patent Application No. 2013-257689, dated Apr. 11, 2016, translated Oct. 18, 2016, 6 pages.

* cited by examiner

[Figure 4]
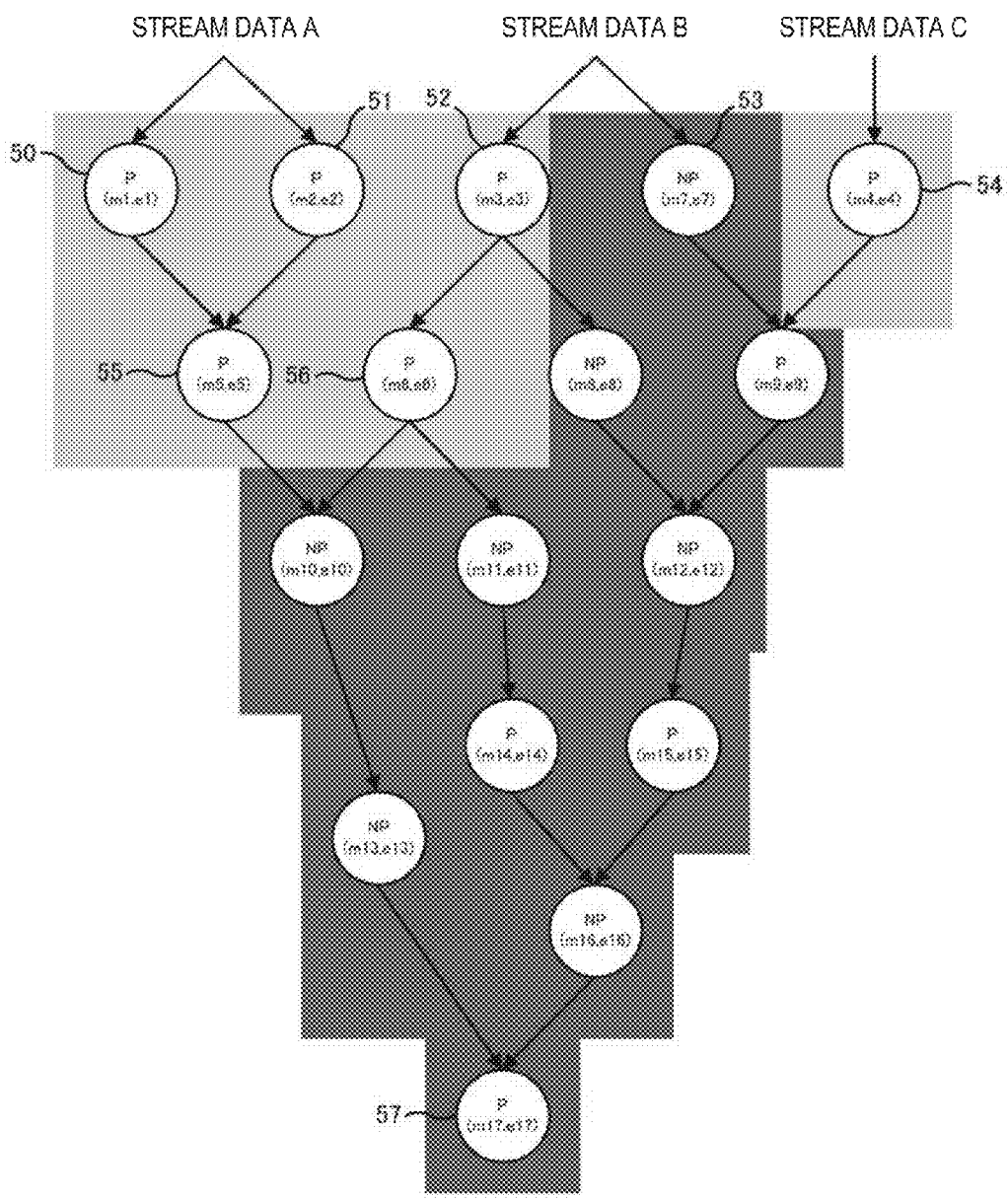

[Figure 5]
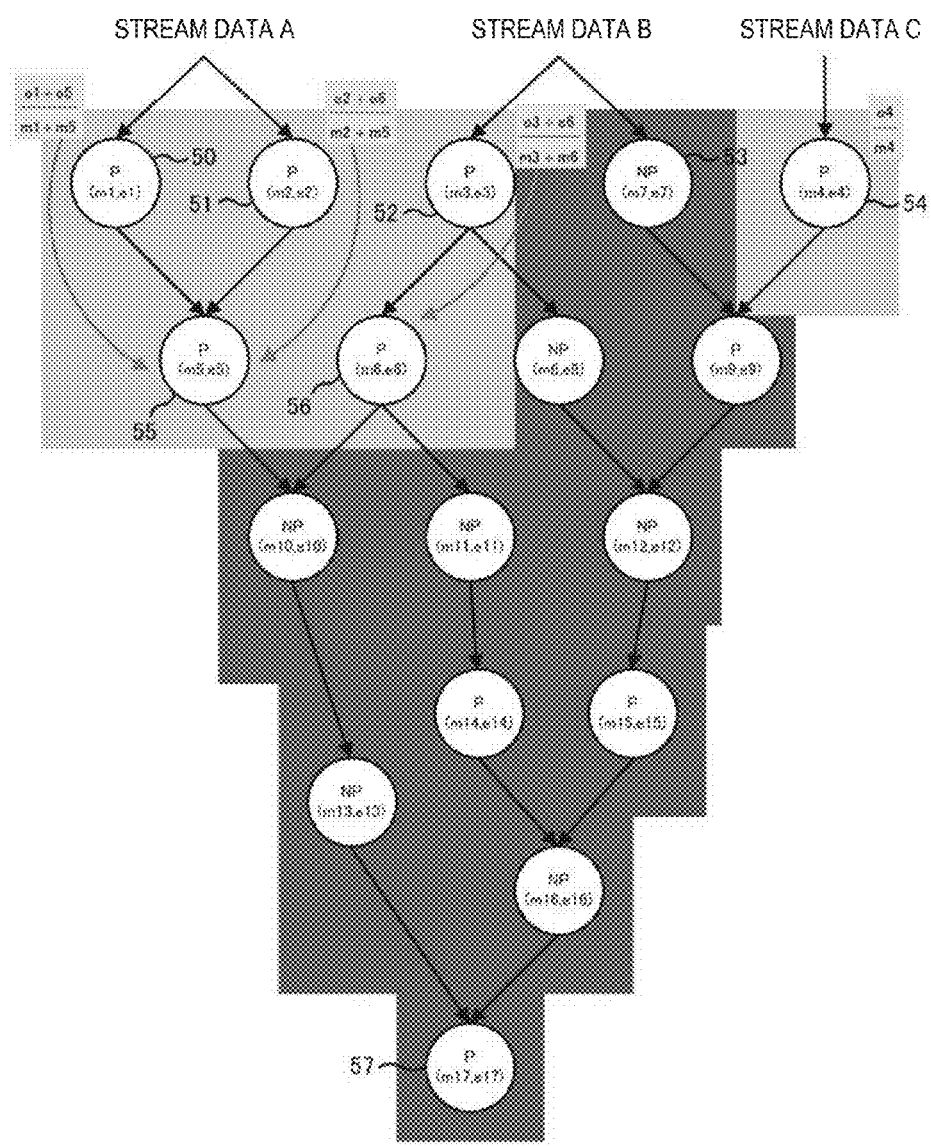

[Figure 6]
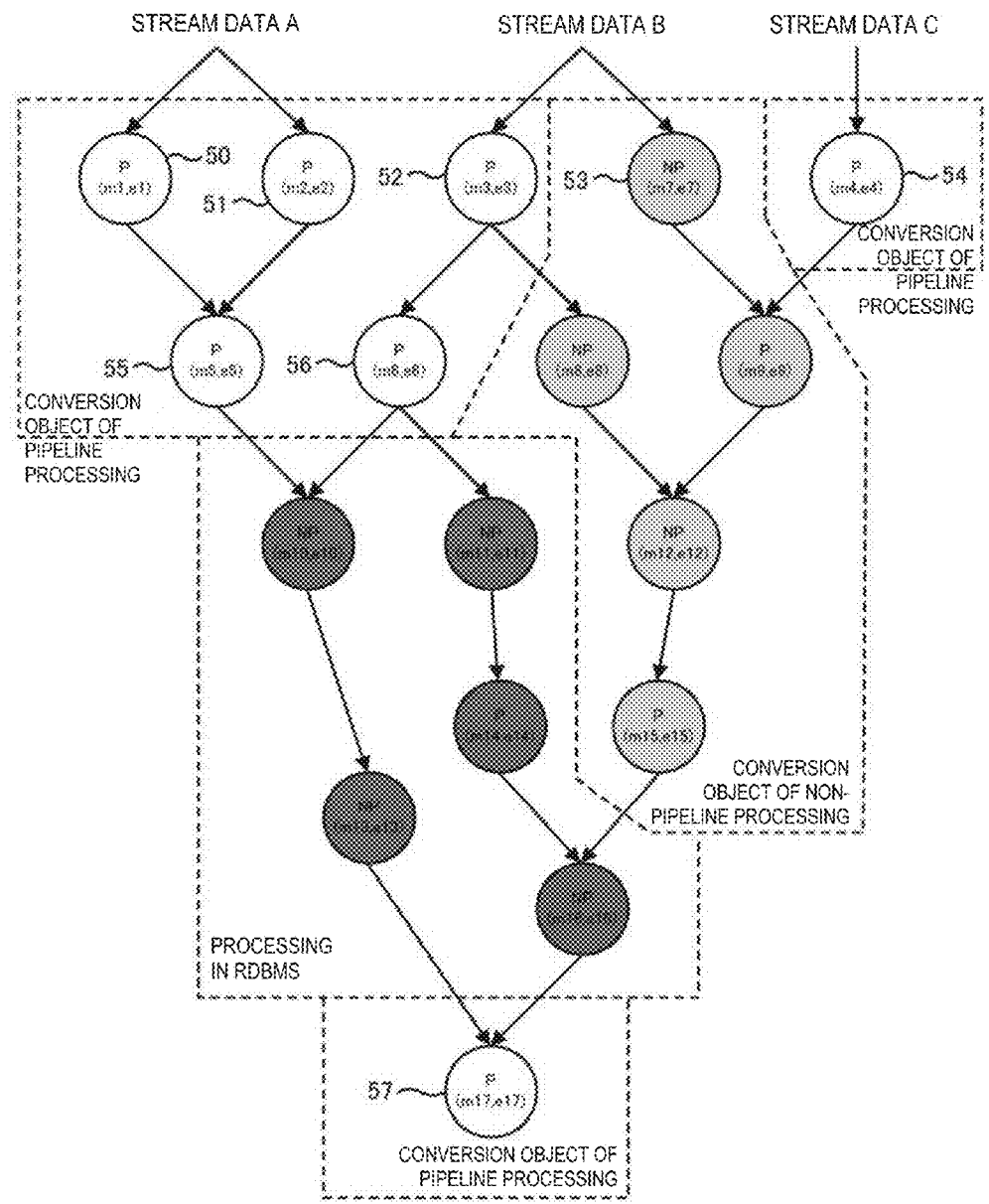

[Figure 7]
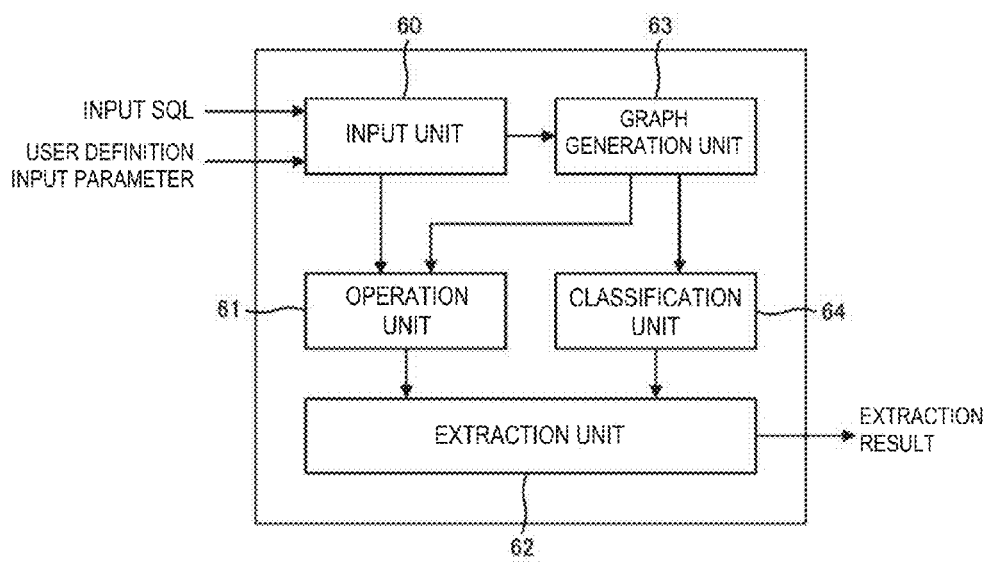

[Figure 8]

```
type B = tuple <A1, A2, ..., D1, D2, ..., F1, F2, ...>

// Filter for "where C"
stream<B> Filter_out0 = Filter(B)
{
    param filter : C;
}

// Aggregate for "group by D1, D2" and "agg(A2)"
(stream<T res_id, A1, agg_A2, agg_E> Aggregate1_out0) as
        Aggregate1 = Aggregate(Filter_out0 as inPort0Alias)
{
    window
            inPort0Alias : tumbling, time($window), partitioned ;   <-- $window is a time range of predetermined
    param                                                               aggregation
            partitionBy : D1, D2;
    output
            Aggregate1_out0 :
                    res_id = getTimestreampInSecs();
                    A1 = ...
                    agg_A2 = agg(A2);
                    agg_E =<aggregation of E sum, count, ...>;
}

// Filter for "having E"
stream<T res_id, A1, agg_A2, agg_E> Aggregate1_out0) Filter1_out0 = Filter(Aggregate1_out0)
{
        param filter : E;
}
```

[Figure 9]
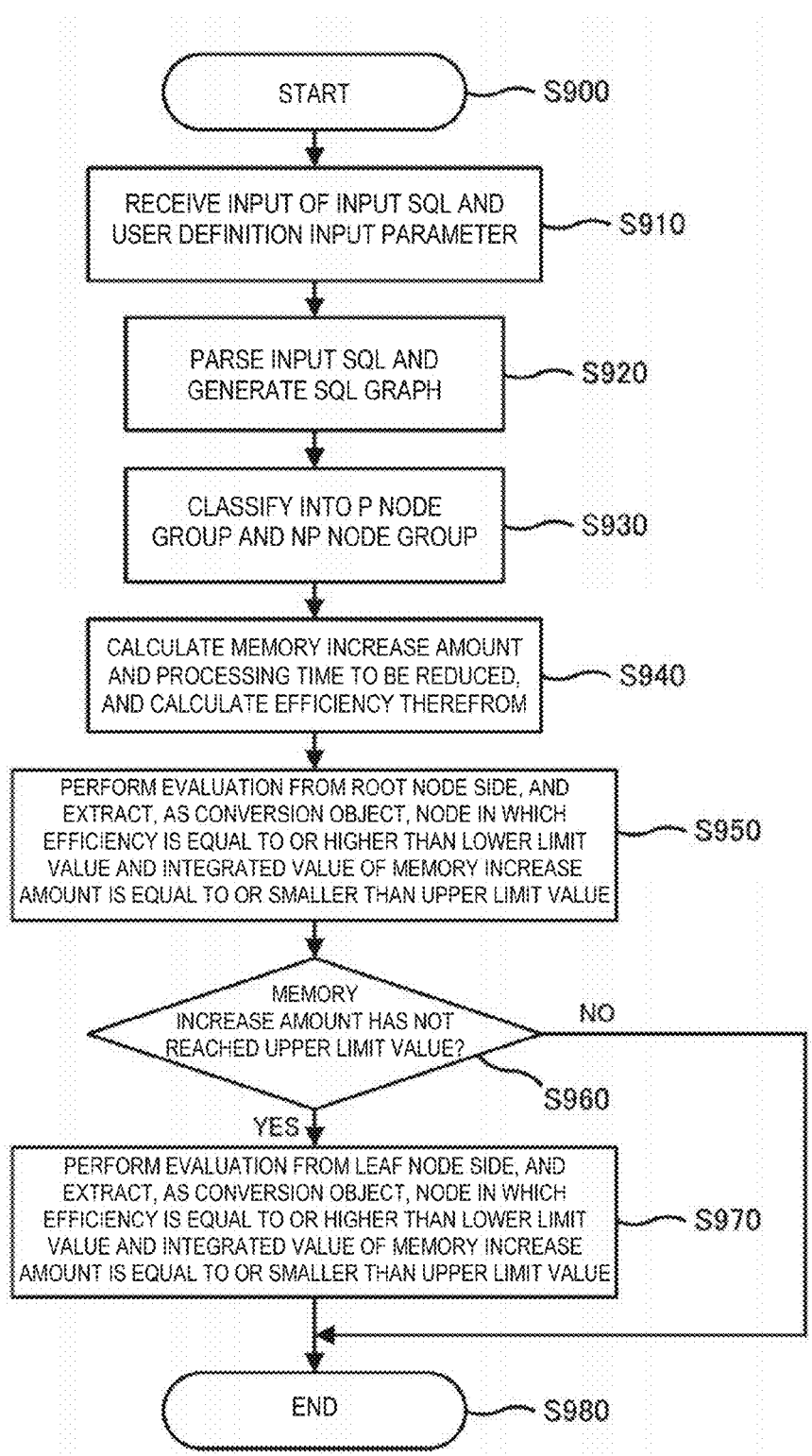

[Figure 10]

```
with
    SLOW_LONG_OP_CARS as (
        select car_id from car_all_table
            where time > $cur_time - 600 and time < $cur_time
            and (avg_speed < 5 and engine_op_time > 120)
            group by car_id
    )
    CONV_STORE_FAV_CAR as (
        select car_id from conv_fav_car_table
            group by car_id
    )
    select distinct SLOW_LONG_OP_CARS.car_id from
    (
        SLOW_LONG_OP_CARS on JAM_CAR.car_id = SLOW_LONG_OP_CAR.car_id
    )
    inner join CONV_STORE_FAV_CAR
    on JAM_CAR.car_id = CONV_STORE_FAV_CAR.car_id
```

[Figure 11]
(a)
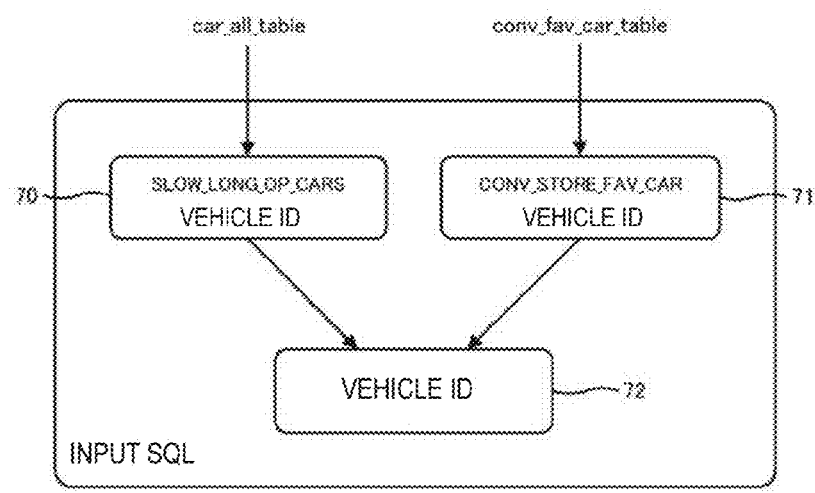
(b)
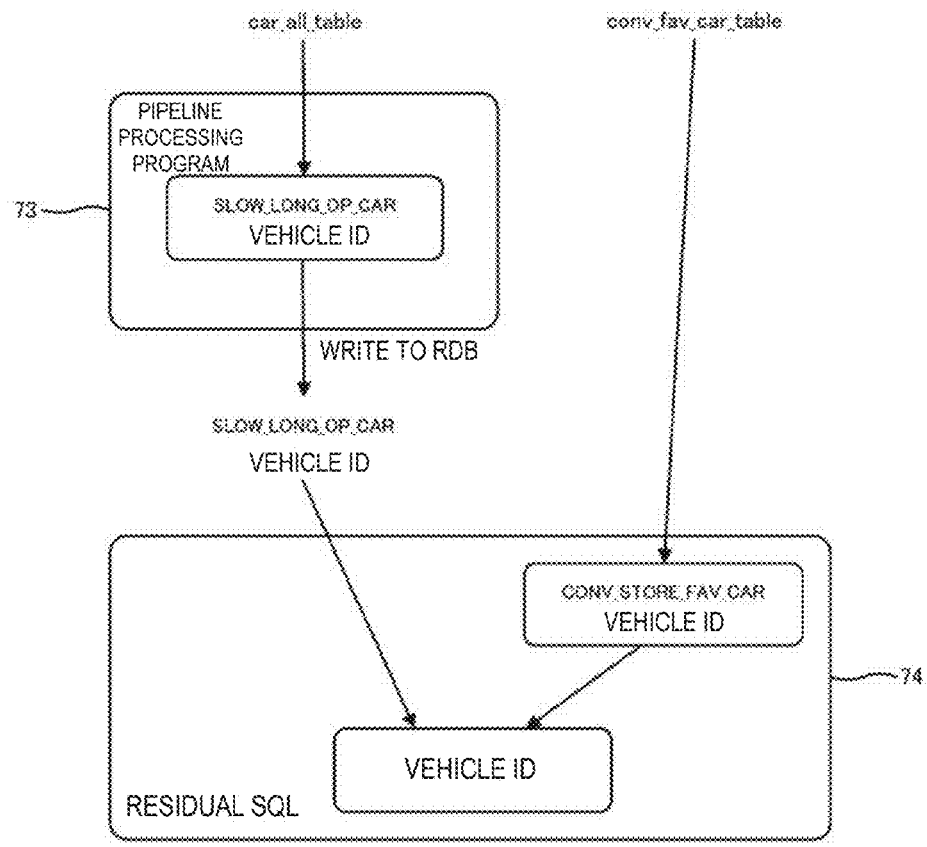

[Figure 12]

(a)
```
(select car_id from car_all_table
    where speed < 5
) as SLOW_CARS
```

(b)
```
select * from car_all_table
    where speed > (select AVG(speed) from car_all_table where time > $cur_time - window and time < $cur_time)
```

[Figure 13]
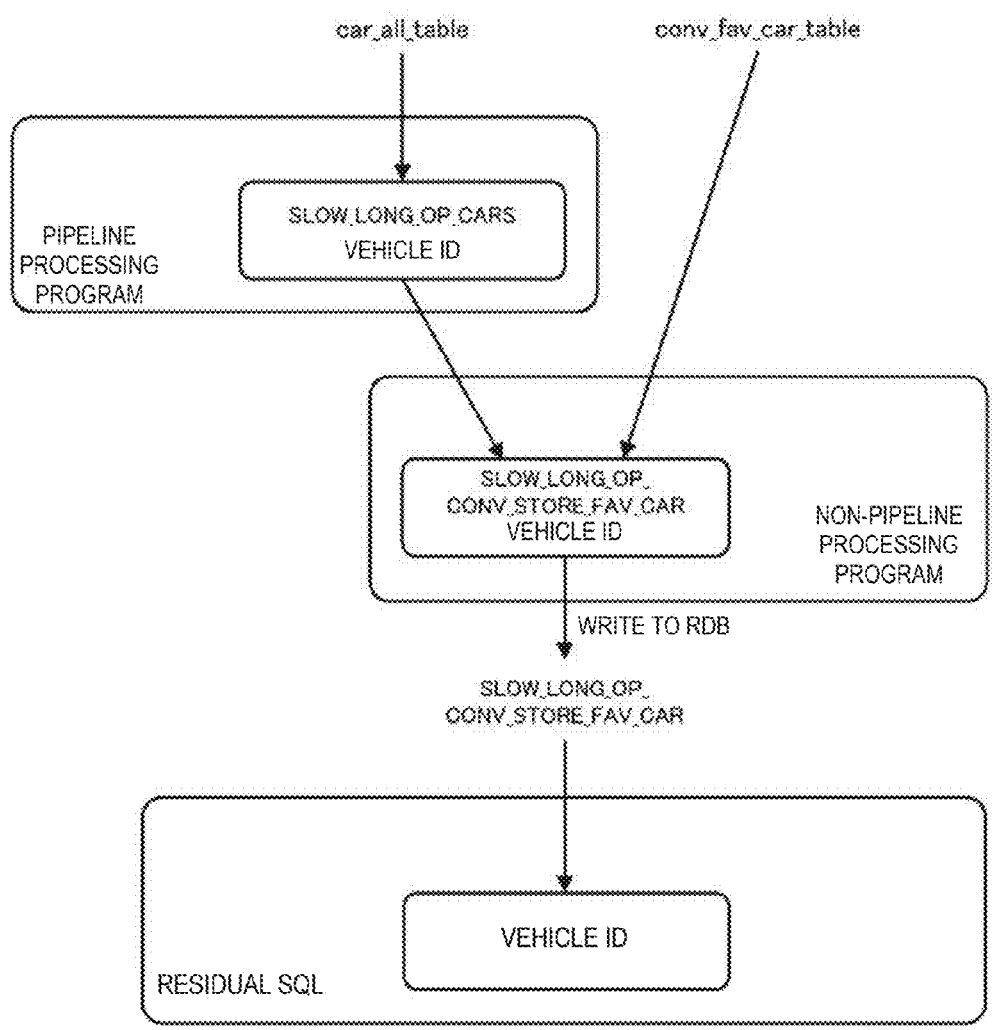

| Loc_id | resid | car_id |
|---|---|---|
| : | | |
| 1 | 11:10:10.00 | 102, 1011, 222... |
| 1 | 11:10:11.00 | 101, 111, 222... |
| 1 | 11:10:12.00 | 301, 40, 300... |
| : | : | : |
| 1 | 11:11:10.00 | 60, 5502, 333... |
| : | | |

(b)

```
with
   SLOW_LONG_OP_CARS as (
      select car_id from car_all_table
         where time > $cur_time - 600 and  time < $cur_time
         and (avg_speed < 5 and engine_op_time > 120)
         group by car_id
   )
   CONV_STORE_FAV_CAR as (
      select car_id from conv_fav_car_table
         group by car_id
   )
   select distinct SLOW_LONG_OP_CARS.car_id from
   (
      SLOW_LONG_OP_CARS on JAM_CAR.car_id = SLOW_LONG_OP_CAR.car_id
   )
   inner join CONV_STORE_FAV_CAR
   on JAM_CAR.car_id = CONV_STORE_FAV_CAR.car_id
```

(c)

```
with
   CONV_STORE_FAV_CAR as (
      select distinct car_id from conv_fav_car_table
         )
   select distinct SLOW_LONG_OP_CARS.car_id from
      (select car_id from SLOW_LONG_OP_CARS
         where time > $(cur_time) - 600 and time < $(cur_time)
         group by car_id
      )
   inner join CONV_STORE_FAV_CAR
   on SLOW_LONG_OP_CARS.car_id = CONV_STORE_FAV_CAR.car_id
```

EXTRACTION DEVICE, DATA PROCESSING SYSTEM, AND EXTRACTION METHOD

CROSS-REFERENCE TO RELATED APPLICATIONS

This application is a continuation of and claims priority under 35 U.S.C. § 120 to U.S. patent application Ser. No. 14/557,459, filed Dec. 2, 2014, titled "EXTRACTION DEVICE, DATA PROCESSING SYSTEM, AND EXTRACTION METHOD", and incorporated herein by reference in its entirety, which claims priority under 35 U.S.C. § 119 to Japanese Application No. JP 2013-257689 filed Dec. 13, 2013, the entire text of which is incorporated herein by reference in its entirety.

BACKGROUND

The present invention relates to a data processing system for executing a query and processing stream data and data stored in a database, an extraction device, which is used in the data processing system, for extracting a conversion object to be converted to a program for processing the stream data from the query, a method for extracting the conversion object, and an extraction program for causing a computer to execute the method.

As sensors such as IC tags, IC cards, online services such as online shopping and online games, cellular phones and smart phones loaded with GPS (Global Positioning System), and car navigation systems connected to a network become widespread, a large amount of data is generated continuously by these sensors or the like. The large amount of data, which is called stream data, flows on a network and is stored in a database for analysis or the like.

The data that is needed is acquired from the database by issuing queries to a database management system (DBMS) which manages the database and executing the queries in the DBMS. The queries can cause the DBMS to execute processing such as updating, and addition and deletion of the data in addition to acquisition of the data.

In recent years, due to the effects of global warming and the like, wind speed and rainfall amount suddenly change and just a few minutes of delay in evacuation sometimes result in a disaster. In order to identify such a sudden change and enable quick evacuation, there is a demand for a high-speed query that is capable of acquiring air flow data and rainfall data in real time.

A large amount of data is stored in the database, and it takes time to search for and acquire the data that is needed. It may take several minutes to several hours, although it depends on data amount and throughput of a machine. This makes it impossible to cope with a case where real time acquisition of the data is required.

BRIEF SUMMARY

In view of the problems, an embodiment of present invention provides an extraction device for extracting, as a conversion object, a sub query to be converted to a program for processing stream data continuously inputted to a database, from a query including one or more instructions as sub queries to be issued to a database management system for managing the database, the extraction device comprising: an input unit for receiving input of the query, a maximum memory increase amount of a memory whose use amount increases with the processing of the stream data, and a lower limit value of efficiency as processing time per unit memory increase amount, the processing time being reduced when the stream data is processed by the program compared to a case where the database management system executes the query; an operation unit for calculating at least one memory increase amount when each sub query included in the query is converted to the program and then the stream data is processed and the processing time to be reduced when the stream data is processed compared to the case of execution by the database management system, and calculating the efficiency by using the at least one calculated memory increase amount and the processing time to be reduced; and an extraction unit for selecting at least one sub query whose calculated efficiency is equal to or higher than the lower limit value, integrating the memory increase amount calculated for the selected sub query, and extracting the selected sub query as a conversion object on condition that the integrated memory increase amount is equal to or smaller than the maximum memory increase amount.

An embodiment of the present invention makes it possible to prevent the occurrence of the memory shortage, and execute the processing by using one query for the stream data and the data stored in the database.

Embodiments of the present invention provide a device and a method capable of preventing occurrence of memory shortage and stoppage of a system, and performing integrated processing using the same query for stream data processing and execution in a data management system.

In the case of processing stream data, it is required to register queries and continuously execute the queries for the stream data that is continuously inputted. To this end, the queries, where instructions for the stream data are described, utilize a stream data processing language such as an SPL (Stream Processing Language) for the description. Such a query is converted to a program for processing the stream data, called a stream data processing code, by compilation, and the processing is executed by executing the code.

On the other hand, in the case of processing data stored in a database, since it is not easy to describe a plurality of queries of, for example, searching a plurality of tables held by the database in the same stream data processing language as above, a database query language such as SQL is utilized.

It has been needed to use the queries described in different languages for processing the stream data and the data stored in the database. Thus, in the prior art, efficient processing by using one query for the stream data and the data stored in the database has not been possible.

In the case of processing the stream data, the stream data is once stored in a memory, and then the stored data is subjected to the processing. It is needed to store the stream data in the memory. However, when the stream data is the large amount of data, memory shortage caused by storing the data may stop a system.

Also, in order to achieve hard real time, it is needed to use an apparatus with strict memory restrictions, such as a client computer and an edge server; thus, the memory shortage tends to occur and system stoppage also tends to occur.

Accordingly, embodiments of the present invention provide a device and a method capable of preventing occurrence of memory shortage and enabling the processing to be efficiently executed to both the stream data and the data stored in the database by one query.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 4 is a diagram illustrating a state of classifying an SQL graph into two node groups;

FIG. 5 is a diagram illustrating a state of calculating efficiency for each path of the SQL graph;

FIG. 6 is a diagram illustrating a state of extracting a node of a conversion object in the SQL graph;

FIG. 7 is a functional block diagram of a client that functions as an extraction device;

FIG. 8 is a diagram illustrating an SPL template;

FIG. 9 is a flowchart illustrating flow of processing performed by the extraction device;

FIG. 10 is a diagram illustrating a query written in SQL;

FIG. 11 is a diagram illustrating sub queries, as nodes, included in the query written in SQL;

FIG. 12 is a diagram illustrating an example description of a sub query for performing pipeline processing and an example description of a sub query for performing non-pipeline processing;

FIG. 13 is a diagram illustrating an example of subjecting a final "Inner join" part to the non-pipeline processing; and FIG. 14 is a diagram illustrating an example of a table generated by the pipeline processing and the non-pipeline processing and an example of the SQL converted to refer to the table.

DETAILED DESCRIPTION

Figure 1:
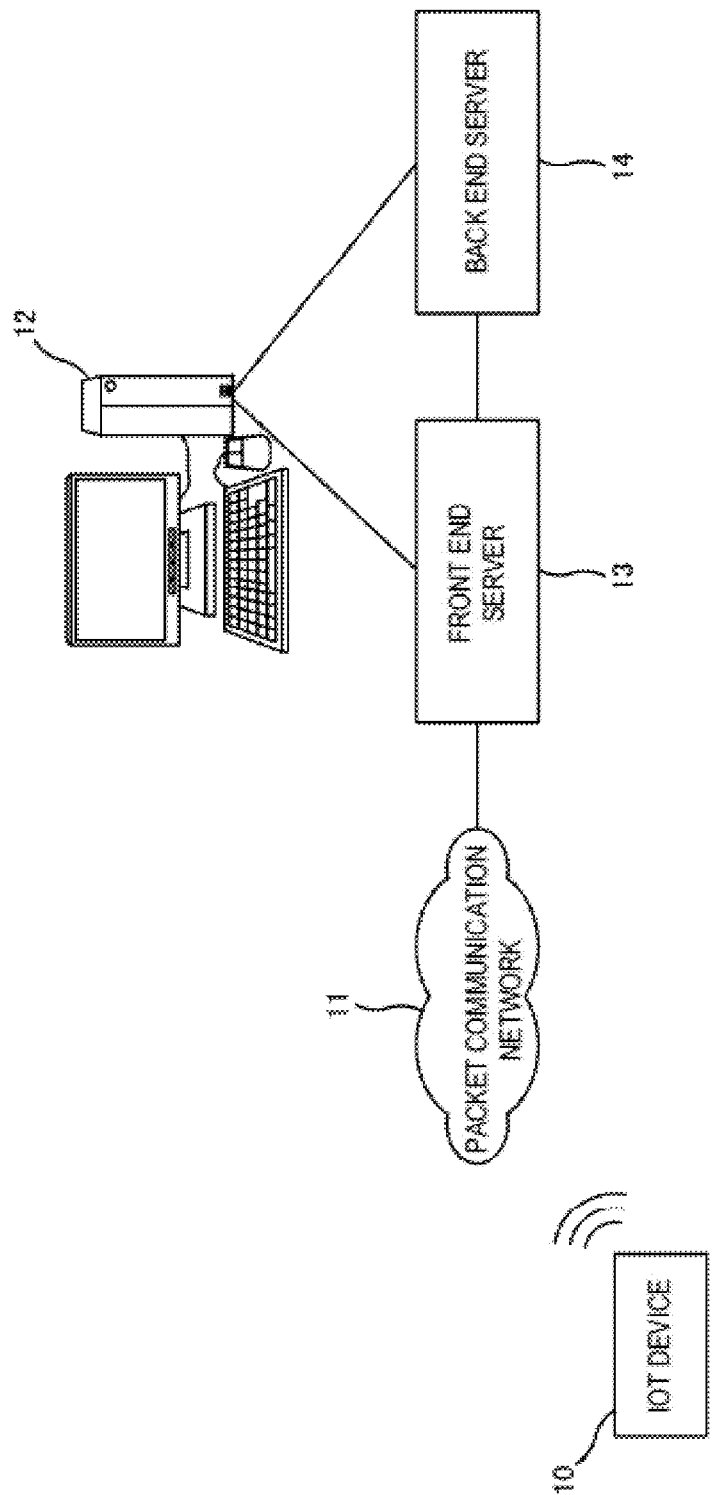
FIG. 1 is an entire configuration diagram of a data processing system of an embodiment of the present invention.

Hereinafter, the present invention will be described along a specific embodiment illustrated in the drawings, but the present invention is not limited to the embodiment described later. FIG. 1 is an entire configuration diagram of a data processing system of an embodiment of the present invention. The data processing system includes an IOT (Internet of Things) device 10, a packet communication network 11, a client computer (hereinafter abbreviated as a client) 12, a front end server 13, and a back end server 14. Although one each of individual apparatuses is illustrated in FIG. 1, the data processing system may include two or more of the individual apparatuses.

The packet communication network 11 is a communication network for transmitting and receiving packets in which data is divided, and includes the Internet. The IOT device 10 is a device, which is connectable to the Internet, for generating the data and transmitting it to the Internet. Examples of the IOT device 10 include a vehicle, a healthcare device, and various kinds of sensors installed in factories, schools, or the like. Communication between the IOT device 10 and the packet communication network 11 is conducted by radio communication such as Wi-Fi via an access point not illustrated in the figure.

Examples of the healthcare device include, for instance, a scale, a body composition meter, a pedometer, an activity meter, a basal thermometer, and a sphygmomanometer. These devices include a sensor for performing measurement to generate measurement data and transmit it to the Internet.

The vehicle includes a GPS for measuring a position, a vehicle speed sensor, various kinds of pressure sensors for a fuel pressure or the like, and various kinds of temperature sensors for room temperature, the outside air temperature or the like to transmit measurement data that is detected and generated by each sensor. The healthcare device measures weight, the number of steps, body temperature, blood pressure, or the like and transmits the generated measurement data. Examples of the various kinds of sensors installed in factories or the like include, for instance, sensors loaded on a thermometer, a flowmeter, a manometer, a densitometer, or the like installed in a plant or a device for measuring them.

The client 12 is a PC or the like used by a user, receives input of a query to be executed in the front end server 13 used as a first processor and the back end server 14 used as a second processor and various kinds of parameters, and performs compilation of the query or the like. Details of the query, the parameters and the compilation will be described later. Note that the query is a description of an inquiry to a database provided in the back end server 14 in a database description language such as an SQL.

The front end server 13 receives input of stream data such as a large amount of measurement data transmitted by the IOT device 10 to the packet communication network 11, processes the stream data, and outputs the result to the back end server 14. The front end server 13 receives a program called a stream data processing code generated by the compilation of the query by the client 12, executes the stream data processing code, and subjects the inputted stream data to prescribed processing. Thus, the processing of part or the entire query can be executed.

The back end server 14 receives the result of the processing by the front end server 13, and when there is remaining processing to be executed in the query, executes the processing, stores the result in the database, and also returns the result to the client 12. Also, the back end server 14 performs the processing of storing the stream data in the database. Therefore, the back end server 14 includes a database management system (DBMS) for managing the database and executing the processing to the database.

The database is constructed in the back end server 14, and thus the back end server 14 may be used as a database server. However, it is not limited to this and the database may be installed to the outside where it is accessible from the back end server 14. Also, for the database, a database adopting a hierarchical data model indicating data by a tree structure or a relational database for making an inquiry by a logical operation or the like may be used. When using the relational database, for the DBMS which manages the data, a relational database management system (RDBMS) is used. The relational database and the RDBMS are not described in detail here because they are well known. Hereinafter, a description will be given assuming that the RDBMS is to be used.

Figure 2:
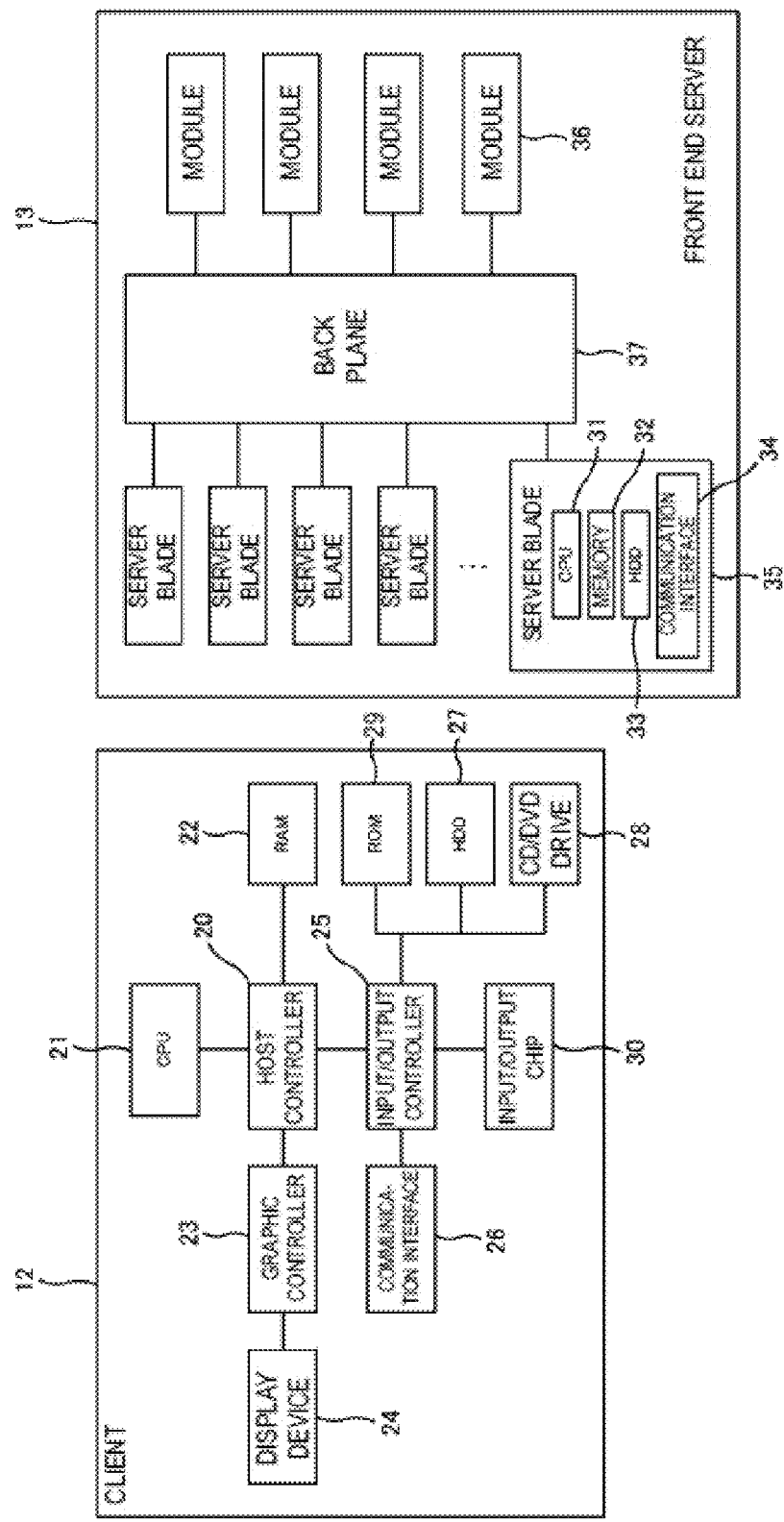
FIG. 2 is a diagram illustrating hardware configuration of a client and a front end server provided in the data processing system illustrated in FIG. 1.

Here, hardware configuration of each apparatus will be described briefly with reference to FIG. 2. The IOT device 10, although not shown in the figure, includes a thermometer having a thermistor or the like when outputting temperature data, a speedometer when outputting speed data, and a manometer when outputting pressure data, respectively. For the speedometer and the manometer, a speed sensor and a pressure sensor are used. The IOT device 10 also includes communication means such as a transmitter for transmitting the measurement data to the Internet.

The client 12 includes a CPU 21, a RAM 22, a graphic controller 23, and a display device 24 that are interconnected via a host controller 20, and a communication interface 26, a hard disk drive (HDD) 27, and a CD/DVD drive 28 that are connected to the host controller 20 via an input/output controller 25. Also, the client 12 includes a ROM 29 connected to the input/output controller 25, and a legacy input/output device having an input/output chip 30.

The host controller 20 connects the RAM 22 and the CPU 21 and the graphic controller 23 that access the RAM 22 at a high transfer rate. The CPU 21 executes a boot program, an OS, and an extraction program, etc., stored in the ROM 29 or the HDD 27. The CPU 21 may be a multiprocessor capable of parallel processing.

The graphic controller 23 acquires image data generated on a frame buffer provided in the INPUT/OUTPUT CONTROLLER 25 by the CPU 21, and displays it on the display device 24. The graphic controller 23 may include the frame buffer therein.

The input/output controller 25 connects the host controller 20 that is a relatively high-speed input/output device, the communication interface 26, the HDD 27, and the CD/DVD drive 28. The communication interface 26 communicates with the other devices via a network. The HDD 27 stores the OS, the extraction program, an application program, and various kinds of data, etc. When the extraction program and the various kinds of data or the like are recorded on a CD-ROM or a DVD, the CD/DVD drive 28 reads and provides them to the input/output chip 30 via the RAM 22.

To the input/output controller 25, the ROM 29 and a relatively low-speed input/output device such as the input/output chip 30 are connected. The ROM 29 stores, for example, the boot program for loading the OS from the HDD 27 and activating it, and firmware having initialization information of a computer and an apparatus or the like recorded thereon. The input/output chip 30 connects an input/output device of each unit via a parallel port, a serial port, a keyboard port, a mouse port, or the like.

The front end server 13 and the back end server 14 have the same hardware configuration, and both may use a blade server. Therefore, only the front end server 13 will be described. The front end server 13 includes one or more server blades 35 having a CPU 31, a memory 32, an HDD 33 and a communication interface 34, and a housing for housing the one or more server blades 35. The housing includes various kinds of modules 36 such as a management module for monitoring operations of the individual server blades 35 and switching to the other server blade when abnormality is detected, an I/O module for assigning a LAN adapter or the like required for communication by the individual server blades 35, and a power module, and a back plane 37 having a connector for interconnecting the server blades 35 and the various kinds of modules 36.

The front end server 13 is capable of increasing the number of servers and improving throughput by connecting an additional server blade to the connector provided in the back plane 37. When using the back end server 14 as a database server, the HDD provided in each server blade of the back end server 14 can be used for the database. Note that the front end server 13 and the back end server 14 are not limited to the blade server and other rack mount type server and tower type server or the like may be used.

Figure 3:
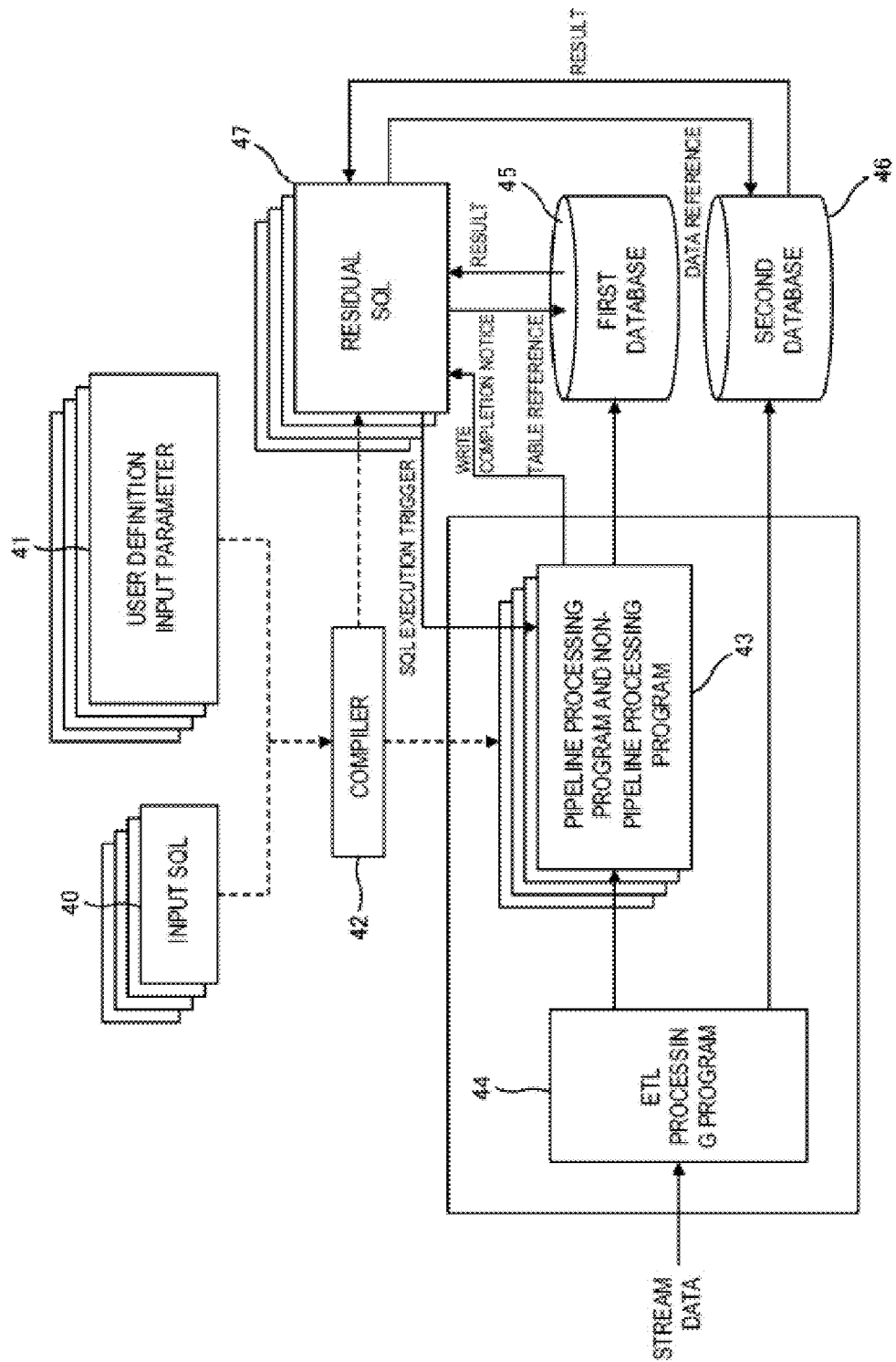
FIG. 3 is a diagram for describing processing to be performed by the data processing system illustrated in FIG. 1.

With reference to FIG. 3, the processing performed by the data processing system will be described in detail. The stream data is continuously transmitted from the IOT device not shown in the figure, and the client 12 receives the query indicated as an input SQL 40 and a user definition input parameter 41 corresponding to it in response to input from a user. Here, four input SQLs 40 are inputted and four user definition input parameters 41 corresponding to them are inputted.

The input SQL 40 includes one or more instructions written in SQL as sub queries. The sub query describes the processing or an operation to the data. Examples of the operation include, for instance, an operation of, when temperature data associated with each device is inputted as the stream data, extracting only the device for which the temperature indicates 300° C. or higher. In this case, the temperature may be a one-hour average of 300° C. or higher. Since this is one example, the operation of the sub query is not limited to this.

As the user definition input parameter 41, for instance, the following three parameters can be set. The first parameter is a parameter called a data storage time period, and specifies a time period of the data for storing the stream data in a memory. Since the stream data is continuously inputted as packets, in order to perform the processing, it is needed to section the stream data by the time period or the number of the packets and perform the processing. Here, as the parameter, the time period is inputted.

For the time period, for instance, the time such as 1 minute or 10 minutes can be specified. When 10 minutes is specified as the time period, after the stream data is inputted and is stored for 10 minutes, the data within the 10 minutes is subjected to the processing. Since a data amount to be stored in the memory at one time increases as the specified time becomes long, the appropriate time is specified. Instead of the parameter, a parameter for specifying the number of the packets may be inputted.

The second parameter is a parameter called the maximum memory increase amount. When performing the processing, the data is once stored in the memory and then the stored data is subjected to the processing. The parameter specifies the maximum value (upper limit value) of the memory increase amount to be increased by storing the data.

The third parameter is a parameter called a lower limit value of efficiency. The input SQL 40 includes one or more sub queries. In the data processing system, the client 12 compiles the input SQL 40, extracts the sub query for processing the stream data from the one or more sub queries included in the input SQL 40, and converts only the extracted sub query to generate the stream data processing code.

Upon the extraction, in order to determine which sub query is to be extracted, the processing time when the input SQL 40 is executed in the RDBMS without converting any sub query and the processing time when the stream data processing code is generated and the processing is performed for each sub query are calculated, they are compared, and the processing time to be reduced is calculated. When performing the processing by the stream data processing code, since the data is stored in the memory and the stored data is subjected to the processing, the use amount of the memory increases. Accordingly, an increased amount of the memory due to the storing operation, that is the memory increase amount, is also calculated. The processing time to be reduced is divided by the memory increase amount to calculate the processing time to be reduced per unit increase amount of the memory, and it is defined as the efficiency. Therefore, the efficiency becomes an index that indicates how much processing time is to be reduced and how efficiently the processing is to be performed. The third parameter specifies the lower limit value of the efficiency calculated in this way.

In FIG. 3, a compiler 42 for performing the compilation parses the input SQL 40, and generates a graph expressed by a tree structure in which each sub query is each node. In the tree structure, a side to which the stream data is inputted is defined as a root node, and a node at the end is defined as a leaf node. The root node has no parent node connected thereto, and the leaf node has no child node connected thereto. The compiler 42 determines whether or not each node is capable of pipeline processing on the basis of a parse result, defines the node capable of the pipeline processing as a pipeline processing node (P node), and defines the node incapable of the pipeline processing as a non-pipeline processing node (NP node).

The P node is a node in which a condition for processing the data is fixed and which is capable of immediately processing inputted data and outputting the processing result to a following child node. The P node is capable of processing each packet flowing in the stream data, for instance, so that it has characteristics that the memory increase amount is small and an effect of reducing the processing time is large.

The NP node is a node which includes an aggregate function of calculating an average, a total and the maximum value or the like, and has a need of storing the data within a fixed time period in the memory. Therefore, the memory increase amount is large and there is no effect of reducing the processing time; however, since in-memory execution is possible, the processing time can be reduced compared to the case of executing the input SQL 40 in the RDBMS. In-memory is a technique of writing all data to be utilized to a memory and not reading it from a database when executing a program.

An example of expressing the input SQL 40 with a tree structure is illustrated in FIG. 4. Among the individual nodes, reference character "P" denotes a P node, and reference character "NP" denotes an NP node. Reference characters "m1" to "m17" described on the lower left denote the memory increase amount when subjecting the node to stream data processing such as the pipeline processing or the non-pipeline processing, and reference characters "e1" to "e17" on the right denote the processing time to be reduced when performing the stream data processing to the node compared to the case of executing the input SQL 40 in the RDBMS. The processing time when executing the input SQL 40 in the RDBMS is not the processing time when actually executing it but is estimated processing time, and is the processing time derived from calculation.

Stream data A is inputted to root nodes 50 and 51, stream data B is inputted to root nodes 52 and 53, stream data C is inputted to a root node 54, and the processing is executed. For instance, a result of the processing in the root node 50 and a result of the processing in the root node 51 are outputted to a node 55 which is the child node thereof, and processed by the node 55. Then, a result of the processing in the node 55 is outputted to the next node sequentially and finally outputted to a leaf node 57 at the end, and final processing is executed in the leaf node 57. A result of the processing in the leaf node 57 becomes a processing result of the input SQL 40, and is stored in the back end server 14, also sent to the client 12 and displayed or the like.

In order to perform the processing at a high speed, the root nodes which are P nodes are detected, the individual detected root nodes are sequentially traced, and the nodes are classified into one or more P node groups formed only of P nodes before reaching an NP node in the traced route (path) and one or more NP node groups formed of the other nodes. In FIG. 4, the node group formed only of P nodes in a light color area is the P node group, and the node group formed of the other nodes including NP nodes in a dark color area is the NP node group. In FIG. 4, two P node groups and one NP node group are illustrated. After the classification, the memory increase amount and the processing time to be reduced are calculated.

A memory increase amount M is a memory amount required for storing the data assumed to be needed in order for the node to perform the processing to the stream data. Processing time $t_{RDBMS}$ when the processing is performed in the RDBMS and processing time $t_{stream}$ when the stream data processing, that is the pipeline processing or the non-pipeline processing, is performed are calculated, and processing time $t_{red}$ to be reduced can be derived from the difference. Specifically, it can be calculated by the following expression (1).

[Expression 1]

$$t_{red} = t_{RDBMS} - t_{stream} \quad (1)$$

The memory increase amount M and the processing time $t_{red}$ to be reduced can be calculated on the basis of a data rate of the stream data, a time period (WINDOW) for the stream data to be subjected to the processing, statistical information obtained from the result of executing the query in the past, and information about an operation of the query. A specific calculation method thereof will be described later. By using the memory increase amount M and the processing time $t_{red}$ to be reduced calculated in this way, the processing time to be reduced per unit memory increase amount, that is efficiency $E_m$ (second/byte), is calculated by the following expression (2).

[Expression 2]

$$E_m = \frac{\sum t_{red}}{\sum M} \quad (2)$$

This efficiency $E_m$ tends to be a large value because the memory increase amount is small in the case of including P nodes. That is, the processing can be efficiently performed. For the memory increase amount M and the efficiency $E_m$, the maximum memory increase amount $M_{max}$ of the parameter inputted by the user and the lower limit value $E_{min}$ of the efficiency are compared. The memory increase amount M is added, and until the integrated value $M_{com}$ reaches the maximum memory increase amount $M_{max}$, addition of the node as a conversion object into the stream data processing code to perform the pipeline processing or the non-pipeline processing is performed. At the time, it is also confirmed simultaneously that the efficiency $E_m$ is not the lower limit value $E_{min}$ or lower.

When the efficiency $E_m$ becomes the lower limit value $E_{min}$ or lower, it means that the memory increase amount is large for the short processing time $t_{red}$ to be reduced and the efficiency is not improved so much even when the pipeline processing or the non-pipeline processing is performed. Therefore, when the efficiency becomes the lower limit value $E_{min}$ or lower, addition of the node as a conversion object is not performed. For the nodes not extracted as conversion objects, the pipeline processing or the non-pipeline processing is not performed and the processing is executed in the RDBMS.

Whether or not the addition of the node as a conversion object is performed can be evaluated by sequentially selecting the node. As one example of the selection method, the node can be selected in a width priority order of the P node group. Here, width priority is a method of preferentially selecting the node in the same hierarchy starting from the root node. First, one root node in the P node group is selected. The root node at which position is to be selected first can be predetermined by setting. Whether or not the root node is a conversion object is evaluated, and the adjacent root node at the same hierarchy is evaluated sequentially. When there is no more node at the same hierarchy, the child node at the hierarchy one below is traced. For the child node of the lower hierarchy, when the parent node is subjected to the processing in the RDBMS, the child node is also subjected to the processing in the RDBMS. When the evaluation of all the nodes in the P node group is ended, evaluation is performed in the same way for another P node group.

When there is not another P node group or the evaluation is ended for all the P node groups, evaluation is performed for NP node groups as in the case of the P node groups, and conversion objects are extracted. When it is determined to execute the processing in the RDBMS for the root node, evaluation is not performed for all the nodes in the same path, and it is determined to execute the processing in the RDBMS for the nodes. The memory increase amount M for the node added as a conversion object is added to the integrated value $M_{com}$ of the memory increase amount at any time.

Referring to FIG. 5, a detail description will be given. First, one of the P node groups in the light color area is selected. Here, the P node group constituted of the nodes 50, 51, 52, 55 and 56 is selected. This P node group has three paths: a path from the node 50 to the node 55, a path from the node 51 to the node 55, and a path from the node 52 to the node 56.

First, the node 50 is selected, and the efficiency $E_m$ is calculated as e1/m1 by the expression (2). The e1/m1 is compared with the lower limit value $E_{min}$, and when it is equal to or larger than the lower limit value $E_{min}$ and also a new integrated value obtained by adding m1 to the integrated value $M_{com}$ of the memory increase amount until then is equal to or smaller than the maximum memory increase amount $M_{max}$, the node 50 is added as a conversion object. Then, the node 51 and the node 52 are evaluated in the same way. If the node 50 and the node 51 which are the parent nodes of the node 55 become conversion objects, the efficiency (e1+e5)/(m1+m5) of the path from the node 50 to the node 55 and the efficiency (e2+e5)/(m2+m5) of the path from the node 51 to the node 55 are calculated, the larger one is defined as the efficiency $E_m$, evaluation is performed in the same way, and when a condition is satisfied, the node 55 is added as a conversion object. In such a manner, for the node having a plurality of paths, evaluation is performed using the largest value of the calculated efficiency $E_m$.

Since the node 55 has no child node which is a P node, evaluation is performed in the same way for the node 52 which is the adjacent root node. In this way, evaluation is performed in the same way for the node 56 and the node 54 in another P node group as well.

Here, while the description is given only for the P node groups, evaluation can be performed in the same way for the NP node groups in the dark color area. Also, in this case, when it is determined to execute the processing in the RDBMS for the root node, evaluation is not performed for all the nodes in the same path, and the processing is executed in the RDBMS for all the nodes.

Even when the evaluation is performed in such a manner and all the nodes of all the P node groups illustrated in FIG. 5 and some nodes of the NP node group are determined to be conversion objects, there is a case where the integrated value $M_{com}$ of the memory increase amount has not reached the maximum memory increase amount $M_{max}$. In order to perform the processing at a high speed, it is desirable to convert as many nodes as possible and perform the pipeline processing and the non-pipeline processing. Therefore, P nodes are evaluated not only from the root node side but also from the opposite leaf node side in the same way, and whether or not each P node is added as a conversion object is determined.

FIG. 6 is a diagram illustrating a state of evaluating P nodes from the root node side, adding P nodes to the conversion objects, and then evaluating P nodes from the leaf node side because the maximum memory increase amount $M_{max}$ is not reached. All the P nodes in the two P node groups are added as conversion objects, and some nodes (light color nodes) in the NP node group are also added as conversion objects. In the evaluation, for the leaf node 57, since it is determined to perform the processing in the RDBMS for both high-order nodes connected to the leaf node 57, evaluation is not performed, and it is determined to perform the processing in the RDBMS.

Since the leaf node 57 is a P node and the integrated value $M_{com}$ of the memory increase amount has not reached the maximum memory increase amount $M_{max}$, evaluation is performed in the same way from the leaf node side as well. In FIG. 6, since the integrated value $M_{com}$ has not reached the maximum memory increase amount $M_{max}$ yet even when the memory increase amount calculated for the leaf node 57 is added, the leaf node is added to the conversion objects, and for the high-order NP nodes (dark color nodes) thereof, since $E_m$ is equal to or lower than the lower limit value $E_{min}$, it is determined not to add these nodes to the conversion objects. For the P node held between the NP nodes, since it is determined to execute the processing in the RDBMS for the NP nodes which are the high-order nodes connected thereto both on the root node side and on the leaf node side, evaluation is not performed, and it is determined to execute the processing in the RDBMS as in the case of the high-order nodes.

In such a manner, by performing the evaluation also from the leaf node side and adding the nodes that can be added to the conversion objects, the processing to the processing result in the RDBMS can be performed in the memory. By gathering the processing to be performed in the RDBMS at the center and reducing it as much as possible, the overall processing can be accelerated.

Referring to FIG. 3 again, the nodes added to the conversion objects are converted by the compiler 42, and a program (pipeline processing program) for executing the pipeline processing and a program (non-pipeline processing program) 43 for executing the non-pipeline processing called a stream data processing code are generated. For the continuously inputted stream data, by an ETL processing program 44, basic preprocessing such as filtering is performed and processing of conversion to a form that is easy to use, for example, in the pipeline processing program and the non-pipeline processing program 43 is performed. Also, the ETL processing program 44 performs the processing of storing all the stream data in a second database 46.

The pipeline processing program and the non-pipeline processing program 43 are arranged to execute the processing in the order of the node 50 and the node 55, for instance, of the P node group illustrated in FIG. 4 to FIG. 6, and store the processing result in a first database 45 by periodical write or write by an execution trigger of a residual SQL 47.

For the input SQL 40, since some sub queries are converted to the stream data processing code, the sub queries are removed, and the remaining sub query to be executed in the RDBMS, that is the residual SQL 47, is generated. The residual SQL 47 is executed in the RDBMS, generates a trigger to start the pipeline processing program and the non-pipeline processing program 43, and receives a notice that write to the first database 45 is ended. Accompanying this, the residual SQL 47 acquires the processing result by the pipeline processing program and the non-pipeline processing program 43 from the first database 45 and the data stored in the second database 46, and executes query processing. The processing result by the residual SQL 47 is presented to the user or is utilized by an external application.

The client 12 functions as an extraction device for extracting a conversion object and a conversion device for performing conversion to the pipeline processing program and the non-pipeline processing program 43. The function can be achieved by executing an extraction program and a conversion program stored in the HDD 27 by the CPU 21. Here, these devices are included in the client 12 which is one apparatus, but can be configured as separate apparatuses.

The client 12 includes, as illustrated in FIG. 7, an input unit 60 for receiving input of the input SQL 40 including one or more sub queries, the maximum memory increase amount $M_{max}$ of the memory whose use amount is increased by the stream data processing, and a lower limit value $E_{min}$ of the efficiency, as a functional unit thereof. The client 12 also includes an operation unit 61 for calculating the memory increase amount when the stream data processing is performed and the processing time to be reduced when the stream data processing is performed compared to the case of performing the processing in the RDBMS for each sub query, and calculating the efficiency by using the at least one calculated memory increase amount and the processing time to be reduced.

The client 12 further includes an extraction unit 62 for selecting at least one sub query whose efficiency calculated by the operation unit 61 is equal to or higher than the lower limit value $E_{min}$ of the efficiency that is received by the input unit 60, adding the memory increase amount calculated for the selected sub query to the memory increase amount calculated and integrated for all the sub queries when there are already extracted sub queries, and on condition that the memory increase amount after the addition or the calculated memory increase amount when there is not already extracted sub query is equal to or smaller than the maximum memory increase amount $M_{max}$, extracting the selected sub query as a conversion object.

The client 12 includes at least the input unit 60, the operation unit 61 and the extraction unit 62, and in addition to them, may further include a graph generation unit 63 for parsing the input SQL 40, and generating an SQL graph expressed by a tree structure indicating dependency between nodes, in which each sub query is each node. Also, the client 12 may include a classification unit 64 for determining whether or not each node is a P node capable of the pipeline processing of processing the inputted data and outputting the processing result on the basis of the parse result, and with reference to the graph, and classifying the nodes into one or more P node groups in which the nodes hierarchically connected from the root node are formed only of P nodes and one or more NP node groups formed of the remaining nodes.

When selecting sub queries, the extraction unit 62 can select them in the descending order of the efficiency by setting. This is because the processing can be performed more efficiently by selecting the sub queries sequentially from the one with the higher efficiency. The extraction unit 62 is capable of extracting conversion objects by selecting the nodes in the descending order of the efficiency from the nodes whose efficiency is equal to or higher than the lower limit value, giving the nodes classified into the P node group priority, on the basis of a classification result in the classification unit 64.

If the integrated value $M_{com}$ of the memory increase amount has not reached the maximum memory increase amount $M_{max}$, the classification unit 64 performs classification further into one or more P node groups in which the nodes hierarchically connected from the leaf node side are formed only of P nodes and the NP node groups formed of the remaining nodes. The extraction unit 62 performs evaluation in the same way for the nodes classified into the P node groups. That is, the node whose efficiency $E_m$ is equal to or higher than the lower limit value $E_{min}$ is selected, the memory increase amount calculated for it is added, whether or not the maximum memory increase amount $M_{max}$ is reached is determined, and when it is not reached, the node is added to the conversion objects.

By extracting conversion objects in this way, it is made possible to convert them to the pipeline processing program or the non-pipeline processing program in the conversion device thereafter, generate the residual SQLs where a conversion object portion is eliminated from the input SQLs, send them to the front end server 13 as the first processor and the back end server 14 as the second processor, and execute the processing by using one query to the stream data and the data stored in the database. Also, by extracting conversion objects and limiting the conversion, it is made possible to prevent occurrence of memory shortage due to the memory increased by the pipeline processing and the non-pipeline processing.

Conversion objects can be extracted by predetermining clauses (clauses that can be prepared by a template) of the SQL and finding out a predetermined node of the SQL. When the node other than the conversion objects is inputted, an alarm is displayed and DB access can be kept or an error can be displayed. Examples of the node of the SQL include a "select" clause for inquiring the data, a "where" clause, a "group by" clause, an "order by" clause, and a "having" clause. Also, the stream data processing code can be generated using the template corresponding to the clause of the SQL. FIG. 8 illustrates the template of an SPL to the SQL of "select A1, agg(A2) as agg_A2 from B where C group by D1, D2 having E" as an example of the template.

The processing performed by the client 12 will be described briefly with reference to a flowchart illustrated in FIG. 9. The processing is started from step 900, and the input unit 60 receives the input of the input SQL and the user definition input parameter from the user in step 910. They are sent to the graph generation unit 63, and in step 920, the graph generation unit 63 parses the input SQL and generates the SQL graph expressed by the tree structure indicating the dependency between the sub queries as illustrated in FIG. 4.

In step 930, the classification unit 64 acquires a processing type of each sub query obtained by the parse from the graph generation unit 63, determines whether each sub query is a P node or an NP node from the processing type, and classifies each sub query into the one or more P node groups and the one or more NP node groups. The classification unit 64 delivers the classification result to the extraction unit 62.

In step 940, the operation unit 61 calculates the memory increase amount and the processing time to be reduced when the stream data processing is performed compared to the case of performing the processing in the RDBMS, for each sub query. Then, the operation unit 61 calculates the efficiency from the calculated memory increase amount and the processing time to be reduced. This processing by the operation unit 61 may be executed before the classification by the classification unit 64 or may be executed in parallel with the classification.

In step 950, the extraction unit 62 receives the memory increase amount M and the efficiency $E_m$ calculated by the operation unit 61, the classification result of the classification unit 64 and the graph, and selects at least one sub query whose efficiency $E_m$ is equal to or higher than the lower limit value $E_{min}$. When there are the already extracted sub queries, the extraction unit 62 adds the memory increase amount M calculated for the selected sub query to the memory increase amount calculated and integrated for all the sub queries. Then, when the integrated value $M_{com}$ of the memory increase amount after the addition is equal to or smaller than the maximum memory increase amount $M_{max}$, the extraction unit 62 extracts the selected sub query as a conversion object.

In step 960, whether or not the integrated value $M_{com}$ of the memory increase amount has reached the maximum memory increase amount $M_{max}$ is determined. For instance, it is possible to determine that the maximum memory increase amount $M_{max}$ is reached when a residual amount to reach the maximum memory increase amount $M_{max}$ is equal to or smaller than a fixed amount, and to determine that it is not reached when the residual amount exceeds the fixed amount. When it is determined that the maximum memory increase amount $M_{max}$ is reached, the processing advances to step 980 to end the processing.

In contrast, when it is determined that the maximum memory increase amount $M_{max}$ is not reached, advancing to step 970, the extraction unit 62 selects at least one sub query whose efficiency $E_m$ is equal to or higher than the lower limit value $E_{min}$ from the side of the leaf node. Then, the extraction unit 62 adds the memory increase amount calculated for the selected sub query to the integrated value $M_{com}$ of the memory increase amount, and when it is equal to or smaller than the maximum memory increase amount $M_{max}$, extracts the selected sub query as a conversion object. When the evaluation from the leaf node side is ended, the processing advances to step 980 to end the processing.

Hereinafter, using a specific example, a classification method, a method of calculating the memory increase amount and the processing time to be reduced, the pipeline processing program to be generated after the extraction and the residual SQL or the like will be described in detail. FIG. 10 is a diagram illustrating one example of the input SQL 40. The SQL is the query for making real time coupon issuance processing be executed.

Issuing a coupon of a convenience store to a driver who has been driving for a long time without taking a rest, is stuck in congestion and frequently visits the convenience store is taken into consideration. The input SQL 40 is the query for extracting a pertinent vehicle. In the input SQL 40, "car_all_table" is stream data transmitted by the vehicle. The stream data is data transmitted by each vehicle at every 100 m/second, and includes a vehicle ID for identifying the vehicle, a position ID for identifying a current position of the vehicle, and various kinds of ECU data outputted from an engine control unit (ECU) that controls an engine of the vehicle or the like. Examples of the various kinds of ECU data may include a one-minute average speed, and the operation time of the engine.

"conv_fav_car_table" is a list for which vehicle information about the vehicles that frequently visit a convenience store is acquired from the stream data accumulated in the database as a past action history. "SLOW_LONG_OP_CARS" is a vehicle ID list of the vehicles traveling at a low speed and having the long engine operation time. Whether or not the operation time is long can be determined based on whether or not an arbitrary threshold is exceeded. "CONV_STORE_FAV_CAR" is the vehicle ID list of the vehicles that frequently visit a convenience store.

When the input SQL 40 is parsed, the car_all_table which is the stream data is inputted, and the SLOW_LONG_OP_CARS for performing the processing of extracting the vehicle ID list of the vehicles traveling at a low speed and having the long engine operation time from it is obtained as one node 70. Also, the conv_fav_car_table which is the accumulated stream data is inputted, and the CONV_STORE_FAV_CAR for performing the processing of extracting the vehicle ID list of the vehicles that frequently visit a convenience store is obtained as another node 71. Further, a node 72 for joining the vehicle ID lists is also obtained. In this way, the SQL graph having the tree structure as illustrated in FIG. 11(a) can be generated.

Whether it is the pipeline processing or the non-pipeline processing is determined depending on whether or not it is the node in which a condition in the "where" clause is fixed and which is capable of performing the processing when the stream data is inputted and immediately performing transmission to the following node. In an example illustrated in FIG. 12(a), the vehicle ID (car_id) of the vehicle at a speed (speed) of 5 km/h or lower is acquired and it is immediately made into a list and transmitted, so that it is the pipeline processing. Here, the "where" clause is a command for specifying the condition when selecting the data or the like.

In an example illustrated in FIG. 12(b), since AVG (average) that is the aggregate function is included and it is needed to store the data of a fixed time period in order to calculate the average, transmission cannot be immediately performed to the following node. Therefore, the processing is the non-pipeline processing. For instance, determination can be made depending on whether or not specific characters such as AVG are detected in the "where" clause.

Referring to FIG. 11 again, the SLOW_LONG_OP_CARS is determined as the pipeline processing and extracted as a conversion object, and the conv_fav_car_table is determined as the pipeline processing but is not extracted as a conversion object because the efficiency is low. The node 70 is, as illustrated in FIG. 11(b), extracted as a conversion object and converted to a pipeline processing program 73. In the pipeline processing program 73, by the execution, the pertinent vehicle ID is acquired, it is turned to a list and a table is generated. The input SQL 40 is rewritten to the SQL for which the processing executed by the pipeline processing program 73 is eliminated. For the rewritten SQL, a residual SQL 74 for referring to the result processed by the pipeline processing program 73 is generated.

In the example illustrated in FIG. 11, two tables are joined on the basis of the vehicle ID for instance in the node 72, and the table obtained by joining is sent out; however, when the joining processing is performed as the non-pipeline processing by the non-pipeline processing program, the processing to be executed in the RDBMS is reduced and further acceleration is achieved. Accordingly, configuration can be as illustrated in FIG. 13. FIG. 13 illustrates the residual SQL for which a final "inner join" part indicating the joining processing in the node 72 is replaced with the non-pipeline processing. Also, "Inner join" is an operation of gathering common records present in the two tables into one and joining the two tables.

When the processing is executed by the pipeline processing program and the non-pipeline processing program, the pertinent vehicle ID is acquired and the table in which the acquired vehicle ID is listed is generated. FIG. 14(a) is a diagram illustrating the table generated in such a manner. The table includes the vehicle IDs for which the one-minute average speed is 5 km/h and long-time driving is performed for 120 minutes or longer for WINDOW time. The WINDOW is an inputted time period.

FIG. 14(b) is the same as the example of the input SQL illustrated in FIG. 9. When the table as illustrated in FIG. 14(a) is generated by the pipeline processing program or the like, the input SQL is converted to the residual SQL as illustrated in FIG. 14(c) to refer to the generated table. Specifically, from the processing of extracting the vehicle ID in an in-memory manner in FIG. 14(b) to the processing of extracting the vehicle ID from the table (SLOW_LONG_OP_CARS), the description of the part is rewritten.

The calculation method of the memory increase amount and the processing time to be reduced will be described in detail. The memory increase amount is, when the sub query is a node, a data amount that needs to be held in order to perform the processing of the node. For the P nodes, the memory increase amount is data amount for the time of buffering the inputted stream data. By buffering, a plurality of packets can be processed simultaneously. For the NP nodes, the memory increase amount is data amount for the WINDOW time of the inputted stream data. For the processing of joining (join) the two tables, the memory increase amount is data amount for which the data inputted from the tables is subjected to the Cartesian product operation.

The processing time to be reduced is calculated by the expression (1). In the expression (1), the processing time $t_{RDBMS}$ when the processing is performed in the RDBMS for the input SQL can be calculated by the following expression (3). In the expression (3), "$t_{scan}$" is data scan time for searching for the data, and "$t_{op}$" is data operation time for performing data selection and an operation.

[Expression 3]

$$t_{RDBMS} = t_{scan} + t_{op} \quad (3)$$

The data scan time $t_{scan}$ can be calculated by the following expression (4), and the data operation time $t_{op}$ can be calculated by the following expression 5. In the expression (4), "$D_{in}$" is a data size of the inputted data, and "$U_{scan}$" is the scan time per unit data size. In the expression (5), "$D_{op}$" is the data size of the data which is an operation object, and "$U_{op}$" is the operation time per unit data size. The $U_{scan}$ and $U_{op}$ are obtained beforehand by actually performing execution in the RDBMS or performing the stream data processing, and the obtained values are used.

[Expression 4]

$$t_{scan} = D_{in} \times U_{scan} \quad (4)$$

[Expression 5]

$$t_{op} = D_{op} \cdot U_{op} \quad (5)$$

In the expression (4), the inputted data size can be obtained by sequentially executing the following processing (i) to (iii).

(i) When there is processing of joining (join) a plurality of tables, the data size for which the inputted data is subjected to the Cartesian product operation.

(ii) When there are a "where" clause and a "having" clause, a filter rate of each condition thereof, that is a probability of being possible to extract the pertinent data, is obtained beforehand from the data (statistical information) accumulated in the past, and the data size when applying the filter rate to the data after the processing (i) is calculated. Here, the "having" clause specifies a condition as in the case of the "where" clause, and is a command used in the aggregate function such as AVG.

(iii) The data size when applying a column selection rate selected in "Select" processing to the data after the processing (ii) is calculated. Here, the column selection rate is a value calculated by dividing the number of selected columns by the number of the columns of the inputted data.

In the expression (5), for the data size of the operation object, a value for which the data size after the processing (i) and the data size after the processing (ii) are added can be used.

A description will be given using a specific example. It is assumed that, for the input SQL, the input SQL 40 in the example illustrated in FIG. 10 is used. Input data is the stream data (car_all_table), and it is assumed that each vehicle transmits the packets of 100 columns at every 100 msec, and they are inputted. One column of data is assumed to be 4 bytes. It is assumed that 1,000 vehicles transmit the packets. Accordingly, a data rate of the stream data is 100 columns×4 bytes×10 packets/sec×1000 vehicles=4 MB/sec.

Also, accumulated data (conv_fav_car_table) is, assuming that it is 30 columns of data for 10,000 vehicles, 10000 vehicles×30 columns×4 bytes=1.2 MB.

The buffering time within the nodes of the stream data, that is the buffering time (time period) in the P nodes, is assumed to be 1 sec, and the filter rate obtained from the past statistical information is assumed to be 1%. Note that the filter rate is for the vehicle for which the average speed is lower than 5 km/h and the engine operation time is longer than 120 minutes. The unit data scan time in the case of performing the processing in the RDBMS is assumed to be 10 sec/MB, and the unit data operation time in the case of performing the processing in the RDBMS is assumed to be 2 sec/MB. The unit data scan time in the stream data processing is assumed to be 2 sec/MB, and the unit data operation time in the stream data processing is assumed to be 1 sec/MB. The stream data processing is assumed to be memory processing of Java (R) program.

For the node 70 (SLOW_LONG_OP_CARS) illustrated in FIG. 11(a), each value can be calculated as illustrated in the following (a) to (f).

(a) The memory increase amount is defined as the data amount of the inputted data, and is calculated by the data rate×the buffering time. Namely, it is 4 MB/sec×1 sec=4 MB.

(b) The operation object data size is calculated by the memory increase amount calculated in the (a)+the memory increase amount×the filter rate. Namely, it is 4 MB+4 MB×0.01=4.04 MB.

(c) The processing time $t_{RDBMS}$ in the case of performing the processing in the RDBMS is calculated by the memory increase amount calculated in the (a)×the unit data scan time in the case of performing the processing in the RDBMS+the operation object data size calculated in the (b)×the unit data operation time in the case of performing the processing in the RDBMS. Namely, it is $t_{RDBMS}$=4 MB×10 sec/MB+4.04 MB×2 sec/MB=48.08 sec.

(d) The processing time $t_s$ in the case of performing the stream data processing is calculated by the memory increase amount calculated in the (a)×the unit data scan time in the stream data processing+the operation object data size calculated in the (b)×the unit data operation time in the stream data processing. Namely, it is $t_s$=4 MB×2 sec/MB+4.04 MB×1 sec/MB=12.04 sec.

(e) The processing time $t_D$ to be reduced is calculated by $t_{RDBMS}$ −$t_s$. Namely, it is $t_D$=48.08 sec−12.04 sec=36.04 sec.

(f) The data size of the data to be outputted to the node 72 is calculated by the memory increase amount calculated in the (a)×the filter rate×the column selection rate. Since the number of the selected columns is 1 and the number of inputted columns is 100, the column selection rate is 1/100=0.01. Accordingly, the data size is 4 MB×0.01× 0.01=0.0004 MB (0.4 kB).

For the node 71 (CONV_STORE_FAV_CAR) illustrated in FIG. 11(*a*), each value can be calculated as illustrated in the following (a') to (f'). The (C') to (e') are calculated by computation expressions the same as those in the (c) to (e).

(a') The memory increase amount is the inputted data, and is 1.2 MB.

(b') The operation object data size is 1.2 MB the same as the (a').

(c') The $t_{RDBMS}$ is 1.2 MB×10 sec/MB+1.2 MB×2 sec/MB=14.4 sec.

(d') The $t_s$ is 1.2 MB×2 sec/MB+1.2 MB×1 sec/MB=3.6 sec.

(e') The $t_D$ is 14.4 sec−3.6 sec=10.8 sec.

(f') The data size of the data to be outputted to the node 72 is calculated by the memory increase amount of the (a')×the column selection rate. Since the number of the selected column is 1 and the number of the inputted columns is 30, the column selection rate is 1/30. Accordingly, the data size is 1.2 MB×1/30=0.04 MB (40 kB).

For the node 72 illustrated in FIG. 11(*a*), each value can be calculated as illustrated in the following (a") to (e"). Note that (C") to (e") are calculated by the computation expressions as in the (c) to (e).

(a") The memory increase amount is the input data for the WINDOW time, and is calculated by the Cartesian product of the data outputted from the node 70 for the WINDOW time and the data outputted from the node 71 for the WINDOW time. Here, the WINDOW time is assumed to be 10 minutes (600 sec). Accordingly, it is (0.4 kB×600 sec)× (40 kB×600 sec)=5760000 kB (5760 MB).

(b") The operation object data size is 5760 MB the same as the (a").

(c") The $t_{RDBMS}$ is 5760 MB×10 sec/MB+5760 MB×2 sec/MB=69120 sec.

(d") The $t_s$ becomes 5760 MB×2 sec/MB+5760 MB×1 sec/MB=17280 sec.

(e") The $d_D$ is 69120 sec−17280 sec=51840 sec.

While the extraction device, the data processing system including the extraction device and the extraction method have been described in detail with reference to the drawings, modification can be made within a range that can be conceived by those skilled in the art, such as other embodiments, addition, change and deletion, and any aspect is intended to fall within the scope of the present invention as long as the action and effect of the present invention are demonstrated. Thus, a client including an extraction device and a conversion device or the like may be provided as well.

Also, this extraction method may be achieved by an extraction program for causing a computer to execute processing steps to be executed by individual functional units, and embodiments of the present invention are capable of providing the extraction program as well. The extraction program may be provided by being stored in a recording medium such as a CD-ROM, a DVD, an SD card and an HDD. Also, it can be stored in a content server or the like and acquired by being downloaded from the content server or the like.

REFERENCE SIGNS LIST

10 . . . IOT device
11 . . . Packet communication network
12 . . . Client
13 . . . Front end server
14 . . . Back end server
20 . . . Host controller
21 . . . CPU
22 . . . RAM
23 . . . Graphic controller
24 . . . Display device
25 . . . Input/output controller
26 . . . Communication interface
27 . . . HDD
28 . . . CD/DVD drive
29 . . . ROM
30 . . . Input/output chip
31 . . . CPU
32 . . . Memory
33 . . . HDD
34 . . . Communication interface
35 . . . Server blade
36 . . . Module
37 . . . Back plane
40 . . . Input SQL
41 . . . User definition input parameter
42 . . . Compiler
43, 45 . . . ETL processing program
44 . . . Pipeline processing program and non-pipeline processing program
46 . . . First database
47 . . . Second database
50-57 . . . node
60 . . . Input unit
61 . . . Operation unit
62 . . . Extraction unit
63 . . . Graph generation unit
64 . . . Classification unit
70-72 . . . Node
73 . . . Pipeline processing program
74 . . . Residual SQL

What is claimed is:

1. An extraction method for extracting, as a conversion object, a sub query to be converted to a program for processing stream data continuously inputted to a database, from a query including one or more instructions as sub queries to be issued to a database management system for managing the database, the method comprising:
receiving,
an input query having one or more sub queries,
a maximum memory increase value to indicate an amount of memory by which memory usage may increase when processing the streamed data, and
a lower limit value of efficiency to indicate a ratio of reduced processing time to increased memory usage, the reduced processing time indicating a difference between a first time to process the stream data using the program and a second time to process the stream data using the database management system, the increased memory usage indicating an amount of memory by which memory usage increases due to processing the stream data using the program compared to processing the stream data using the database management system;

calculating, for each sub query in the input query,
- at least one memory increase amount corresponding to a change in memory usage when the sub query is converted to the program and the program is used to process the stream data,
- a processing time reduction corresponding to a difference in a time to process the stream data using the program and a time to process the stream data using the database management system, and
- an efficiency by using the at least one calculated memory increase amount and the processing time reduction;

selecting at least one sub query having a calculated efficiency equal to or higher than the lower limit value;

integrating a memory increase amount calculated for the selected sub query;

extracting the selected sub query as a conversion object on condition that the integrated memory increase amount is equal to or smaller than the maximum memory increase amount, wherein the selected sub queries are extracted in descending order of the calculated efficiency;

parsing the input query and generating a graph expressed by a tree structure having a set of one or more nodes, wherein each sub query is a node in the set of one or more nodes;

determining whether each node in the set of one or more nodes is a first type of node which executes pipeline processing by processing input data and outputting a processing result or a second type of node which does not execute pipeline processing based on a result of parsing the input query;

classifying nodes in the set of one or more nodes into one or more first node groups and one or more second node groups, wherein nodes in the first node groups are hierarchically connected from a root node and include only nodes from the set of one or more nodes which are the first type of node and nodes in the one or more second node groups include remaining nodes from the set of one or more nodes; and selecting first nodes corresponding to sub queries whose efficiencies are equal to or higher than the lower limit value from nodes classified into the first node groups and extracting the first nodes as conversion objects, wherein the first nodes are extracted in descending order of the calculated efficiency.

2. The extraction method according to claim 1, wherein selecting at least one sub query comprises selecting the at least one sub query in the descending order of calculated efficiency.

3. The extraction method according to claim 1, further comprising:
- classifying the one or more second node groups into one or more third node groups and one or more fourth node groups, wherein nodes in the one or more third node groups are hierarchically connected from a leaf node and only which are the first type of node and nodes in the one or more fourth node groups include remaining nodes of the one or more second node groups;
- determining, subsequent to selecting the first nodes and extracting the conversion objects, that the integrate memory increase amount has not reached the maximum memory increase amount; and
- selecting, in response to determining that the integrated memory increase amount has not reached the maximum memory increase amount, second nodes whose efficiencies are equal to or higher than the lower limit value from nodes classified into the third node groups and extracts the second nodes as conversion objects.

4. The extraction method according to claim 1, further comprising
- calculating the memory increase amount and the processing time reduction based on a data rate of the stream data, a time period of the processing of the stream data, statistical information obtained from the result of executing the query in the past, and information about an operation of the query.

* * * * *